E. BADLAM.
Grain-Drill.
No 29,754. Patented Aug 28, 1860.
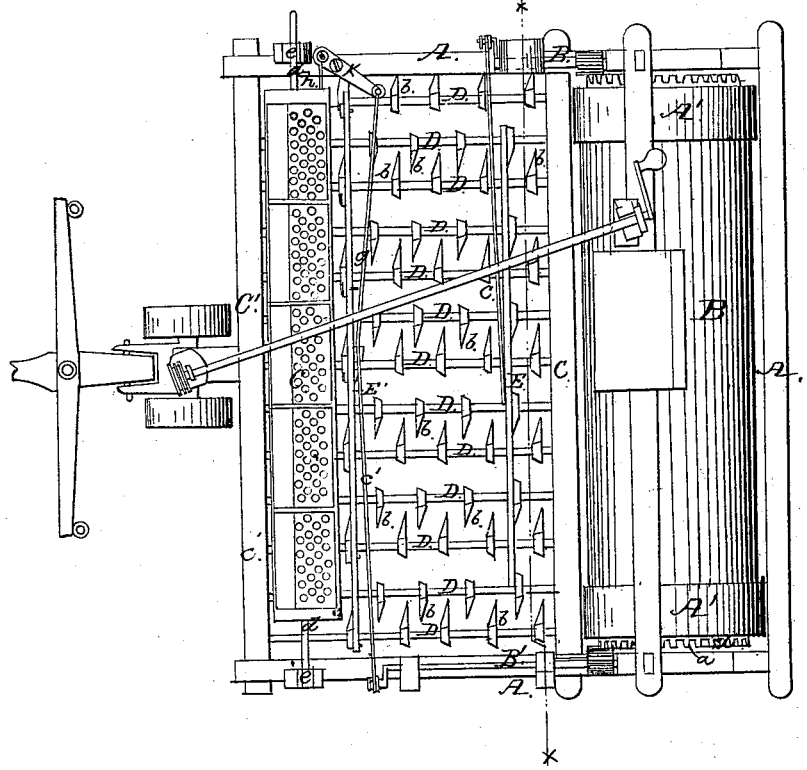

UNITED STATES PATENT OFFICE.

EDWARD BADLAM, OF OGDENSBURG, NEW YORK.

IMPROVEMENT IN SEEDING-MACHINES.

Specification forming part of Letters Patent No. 29,754, dated August 28, 1860.

*To all whom it may concern:*

Be it known that I, E. BADLAM, of Ogdensburg, in the county of St. Lawrence and State of New York, have invented a new and Improved Harrow and Seeding-Machine; and I do hereby declare that the following is a full, clear, and exact description thereof, reference being had to the accompanying drawings, making part of this specification, in which—

Figure 1 represents a plan view of my improved harrow and seeding-machine. Fig. 2 is a vertical transverse section taken through the machine, indicated by the red lines $x\ x$ in Fig. 1.

Similar letters of reference indicate corresponding parts in both figures.

To enable those skilled in the art to make and use my invention, I will proceed to describe its construction and operation.

A is a quadrangular frame, supported at its rear end on two wheels, A' A', which have an annular ring, $a\ a$, of cogged gearing on their outsides, between which wheels a provision is made to attach a cylinder, B, that operates as a coverer and roller for the scattered seed. The side gearing, $a\ a$, on wheels A give rotary motion to two shafts, B' B', which have cranks on their ends.

In front of the driving-wheels A' A', and under the side timbers of the frame A, is bolted a transverse bar, C, and at the front end of the bar C is another bar, C', parallel to bar C. These two pieces C C' serve as end bearings for a number of rock-shafts, D D D, which are arranged parallel to each other entirely across the frame A. Each shaft D has fixed to it a suitable number of teeth $b$, arranged in such a manner that the teeth on one shaft will be opposite the shafts lying next to t, and so on.

Two teeth on each shaft project above this shaft, and these long teeth of every other shaft are connected by pivots to transverse bars E E', respectively, which bars are connected to the crank of shafts B' B' by rods $c\ c'$, and operated by these shafts with alternate reciprocating motions, which, being transmitted to the shafts carrying the harrow-teeth $b\ b$, these teeth are rocked back and forth as the machine is drawn over the field, so as to thoroughly stir and break up the soil and prepare it for receiving seed.

G is a long hopper of the ordinary construction for scattering seed broadcast, which is mounted by rods $d\ d$ on two uprights, $e\ e$, which project up from the sides of frame A, so as to receive an end-play or shaking motion from the front bar, E', through the medium of connecting-rods $g\ h$ and lever K.

The front of the machine may rest on two guiding-wheels, as shown in the drawings, and be raised or depressed by a crank-rod and pulley with a cord; or the draft-pole may be attached to the frame A, whichever may be found most desirable. The soil will thus be thoroughly pulverized and prepared for the seed, which will be harrowed in and rolled by the teeth and roller B'.

Having thus described my invention, what I claim as new, and desire to secure by Letters Patent, is—

The combination and arrangement of harrow-teeth, operating as described, with the shaking seed-hopper G, all receiving their motion from the two driving-wheels A' A', as used for the purposes herein set forth.

EDWARD BADLAM.

Witnesses:
W. E. GUEST,
ELIJAH WHITE.